US009995380B2

(12) United States Patent
Maienschein

(10) Patent No.: US 9,995,380 B2
(45) Date of Patent: Jun. 12, 2018

(54) HYDRODYNAMIC STARTING ELEMENT HAVING A PUMP WHEEL WHICH CAN BE ROTATED RELATIVE TO A HOUSING

(71) Applicant: Schaeffler Technologies AG & Co. KG, Herzogenaurach (DE)

(72) Inventor: Stephan Maienschein, Baden-Baden (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 339 days.

(21) Appl. No.: 14/893,439

(22) PCT Filed: Apr. 30, 2014

(86) PCT No.: PCT/DE2014/200188
§ 371 (c)(1),
(2) Date: Nov. 23, 2015

(87) PCT Pub. No.: WO2014/190985
PCT Pub. Date: Dec. 4, 2014

(65) Prior Publication Data
US 2016/0109008 A1   Apr. 21, 2016

(30) Foreign Application Priority Data

May 27, 2013   (DE) .......................... 10 2013 209 744
May 27, 2013   (DE) .......................... 10 2013 209 749

(51) Int. Cl.
*F16H 41/04*   (2006.01)
*F16H 45/02*   (2006.01)
*F16H 45/00*   (2006.01)

(52) U.S. Cl.
CPC ............. *F16H 41/04* (2013.01); *F16H 45/02* (2013.01); *F16H 2045/007* (2013.01); *F16H 2045/0221* (2013.01); *F16H 2045/0294* (2013.01)

(58) Field of Classification Search
CPC ... F16H 41/04; F16H 45/02; F16H 2045/0221
(Continued)

(56) References Cited

U.S. PATENT DOCUMENTS 2,260,015 A * 10/1941 Fichtner .................. F16H 41/04
60/340
2,652,782 A * 9/1953 Herndon ................. F16D 33/20
416/180

(Continued)

FOREIGN PATENT DOCUMENTS

DE   102006037839 A1   3/2007
DE   102009043243 A1   5/2010
(Continued)

*Primary Examiner* — Michael Leslie
*Assistant Examiner* — Matthew Wiblin
(74) *Attorney, Agent, or Firm* — Brooks Kushman P.C.

(57) ABSTRACT

A hydrodynamic starting element for a drive train of a motor vehicle, having a pump wheel and a turbine wheel, wherein the turbine wheel is arranged on a drive side of the hydrodynamic starting element and the pump wheel is arranged on an output side of the hydrodynamic starting element, wherein a housing is fastened to the turbine wheel and wherein the housing extends from the turbine wheel in the direction of the output side and the housing at least partially encloses the pump wheel in the direction of the output side.

19 Claims, 2 Drawing Sheets

(58) Field of Classification Search
USPC .................................................. 60/338, 366
See application file for complete search history.

(56) References Cited

U.S. PATENT DOCUMENTS

| | | | | |
|---|---|---|---|---|
| 2,952,976 | A * | 9/1960 | Alexandrescu | F16D 33/00 60/366 |
| 3,384,209 | A * | 5/1968 | Murphy | F16H 45/00 192/109 F |
| 3,525,213 | A * | 8/1970 | Hill | F02C 7/36 60/359 |
| 4,711,328 | A * | 12/1987 | Bazilio | F16D 57/04 188/290 |
| 4,889,012 | A * | 12/1989 | Dull | F16H 45/02 192/3.28 |
| 2004/0216971 | A1* | 11/2004 | Johann | F16H 45/02 192/3.26 |
| 2012/0181130 | A1* | 7/2012 | Fukunaga | F16H 45/02 192/3.25 |

FOREIGN PATENT DOCUMENTS

| | | | | | |
|---|---|---|---|---|---|
| FR | 896101 | A | * | 2/1945 | ............. F16H 41/04 |
| GB | 437916 | A | * | 11/1935 | ............. F16H 41/04 |
| GB | 601116 | A | * | 4/1948 | ............. F16H 41/04 |

* cited by examiner

HYDRODYNAMIC STARTING ELEMENT HAVING A PUMP WHEEL WHICH CAN BE ROTATED RELATIVE TO A HOUSING

CROSS-REFERENCE TO RELATED APPLICATIONS

The present application is the U.S. national stage application pursuant to 35 U.S.C. § 371 of International Patent Application No. PCT/DE2014/200188, filed Apr. 30, 2014, which application claims priority from German Patent Application No. 10 2013 209 749.2, filed May 27, 2013, and German Patent Application No. 10 2013 209 744.1, filed May 27, 2013, which applications are incorporated by reference in their entireties.

BACKGROUND OF THE INVENTION

The present invention relates to a hydrodynamic start-off element for a drive train of a motor vehicle for converting an input rotary speed and input torque of a drive motor into an output rotary speed and output torque.

Known hydrodynamic start-off elements are, for instance, hydrodynamic torque converters. A hydrodynamic torque converter is the standard start-off element for conventional automatic transmissions. It does not only convert the rotary speed (clutch) but also a rotary speed/torque (transmission). The individual components of the hydrodynamic torque converter are hydrodynamic devices that form a closed hydrodynamic circuit. An impeller converts mechanical energy introduced by a drive shaft into the hydraulic energy of a fluid and a turbine then reconverts the hydrodynamic energy into mechanical energy, which may then be taken off on an output shaft (minus the losses that have occurred). In addition to its two main components, the impeller and the turbine, a hydrodynamic clutch in general includes a stator for converting torque (for instance what is known as a Föttinger clutch or a Trilok converter).

In the known hydrodynamic start-off elements, the impeller is usually part of a converter housing. As a consequence, a drive-side moment of inertia of such hydrodynamic start-off elements is comparatively high, a fact which has an unfavorable effect on the driving dynamics on the drive side, i.e., on an acceleration and deceleration of the hydrodynamic start-off element. In contrast, the moment of inertia on the power take-off side is comparatively low in the known hydrodynamic start-off elements. This in turn causes the characteristic mode of the natural frequency of the drive train to be at unfavorably high rotary speeds.

SUMMARY OF THE INVENTION

An object of the invention is at least partly to solve the problems explained above and in particular to provide a hydrodynamic start-off element that has improved driving dynamics and provides a more favorable characteristic mode of the natural frequency of a drive train. A further object is to provide a motor vehicle whose hydrodynamic start-off element has improved driving dynamics and provides a more favorable characteristic mode of the natural frequency of a drive train of the motor vehicle.

It is to be understood that the individual features included in the dependent claims may be combined in any desired way that makes sense from a technological point of view to define further embodiments of the invention. In addition, the features included in the claims are described in more detail and explained in the description, which introduces further preferred embodiments of the invention.

The hydrodynamic start-off element of the invention for a drive train of a motor vehicle includes a housing containing an impeller and a turbine, the turbine directly or indirectly connected to a power take-off side of the hydrodynamic start-off element and the impeller directly or indirectly connected to a drive side of the hydrodynamic start-off element. The impeller is capable of rotating relative to the housing.

The hydrodynamic start-off element proposed herein is in particular a hydrodynamic torque converter including an impeller, a stator, and a turbine in accordance with the basic principles of what is referred to as a Föttinger clutch or what is referred to as a Trilok converter. The impeller is (directly) drivable by a drive motor and converts mechanical energy into hydrodynamic energy. The hydrodynamic energy is received by the turbine, which provides it to a power-take-off of the hydrodynamic start-off element. In known hydrodynamic torque converters, both in terms of a direction of a flow of force and in geometric terms, the impeller is disposed on a drive side, also referred to as a primary side, whereas both in terms of a direction of a flow of force and in geometric terms the turbine is disposed on a power take-off side, also referred to as a secondary side. The drive side is the (geometric) side of the hydrodynamic start-off element on which the mechanical energy is introducible into the hydrodynamic start-off element. This in particular means that the drive side is the (geometric) side of the hydrodynamic start-off element on which the hydrodynamic start-off element is connectible to a drive motor, for instance, and/or on which a drive shaft of the hydrodynamic start-off element is located. The power take-off side is the (geometric) side of the hydrodynamic start-off element from which the mechanical energy is transferrable by the hydrodynamic start-off element. This in particular means that the power take-off side is the (geometric) side of the hydrodynamic start-off element on which the hydrodynamic start-off element is connectible to a transmission, for instance, and/or on which a transmission power take-off shaft of the hydrodynamic start-off element is located. The drive side and the power take-off side are usually in particular disposed (at least partly) opposite one another in the direction of a (common) axis of rotation of the impeller and turbine. At this point, it is to be understood that in the present description the preferred use of the terms "drive side" and "power take-off side" is in the sense of a direction of a flow of force. In contrast to the known hydrodynamic torque converters, the turbine of the hydrodynamic start-off element proposed herein is geometrically disposed on the drive side and the impeller is geometrically disposed on the power take-off side of the hydrodynamic start-off element. This is in particular understood to refer to the relative position of the turbine and the impeller in the direction of the axis of rotation of the turbine and the impeller. A (torque converter) housing is attached to the turbine. The housing extends from the turbine in a direction of the power take-off side. The housing preferably encloses the impeller, the stator, and the turbine in a liquid-tight way. In addition, the housing includes at least one region that is shaped like a hollow cylinder and is fixed radially to the outside of the turbine. The impeller is rotatable relative to the housing. This in particular means that the impeller is freely rotatable in the housing. Thus, the housing is not fixed to the impeller, but to the turbine, reducing a drive-side moment of inertia of the hydrodynamic start-off element and increasing a power take-off side moment of inertia of the hydrodynamic start-off element. Thus, the hydrodynamic start-off element of the invention has improved driving dynamics and provides an improved characteristic mode of the natural frequency for a drive train of a motor vehicle.

In accordance with an advantageous further aspect, the impeller may be rotatable through 360° relative to the housing.

In accordance with an advantageous further aspect, the housing extends from the turbine in the direction of the drive side and the housing at least partly encloses the impeller in the direction of the power take-off side. The housing extends from the turbine, in particular along and/or in parallel with the axis of rotation of the turbine and of the impeller, in the direction of the power take-off side of the hydrodynamic start-off element and at least partly or even completely encloses the impeller in the direction of the power take-off side.

The impeller is preferably disposed for co-rotation on a drive shaft and the turbine is disposed on the drive shaft for relative rotation. The drive shaft of the hydrodynamic start-off element is the shaft via which the mechanical energy of the drive motor is introducible into the hydrodynamic start-off element. The impeller is (directly) drivable by the drive shaft. The impeller, the stator and/or the turbine, and the drive shaft preferably have a common axis of rotation. The turbine is fixed to a surface of the drive shaft by a bearing, in particular by a rolling contact bearing, and is freely rotatable relative to the drive shaft.

In accordance with an advantageous further aspect, the housing may be fixed behind the impeller as viewed in the direction of the power take-off side. In particular, the housing starts at the turbine and, via the impeller, (geometrically) extends in the direction of the power take-off side. The housing may be fixed to a transmission power take-off shaft, for instance.

In accordance with an advantageous further aspect, the turbine may be part of the housing. This is in particular understood to mean that the turbine, for instance the hydrodynamic elements thereof, and the housing are connected to one another in a positive (form-locking) or material-locking way.

In accordance with a particularly advantageous further feature, the housing may be connected to a transmission power take-off shaft. The power take-off shaft of the hydrodynamic start-off element is the shaft via which the mechanical energy is conducible to a transmission of the vehicle. For this purpose, the housing is in particular connected for co-rotation to the transmission power take-off shaft.

In accordance with an advantageous further aspect, the housing may be connected to the transmission power take-off shaft via a damper. The damper may for instance be a torsional damper that is suitable for damping vibration of the drive motor.

In accordance with a particularly advantageous further aspect, a clutch for connecting a drive shaft to the housing for co-rotation therewith may be disposed in the housing. This clutch is in particular what is known as a lock-up clutch, which is preferably disengaged only when the vehicle starts off. Once the vehicle has started off, the clutch is preferably engaged, causing torque no longer to be transmitted by the impeller and turbine but directly via the clutch. This advantageously reduces the power loss of the start-off element and increases its efficiency rating.

In accordance with a particularly advantageous further aspect, a clutch for connecting a drive shaft to the housing for co-rotation therewith may be disposed in the housing. This clutch is in particular what is known as a lock-up clutch, which is preferably disengaged only when the vehicle starts off. Once the vehicle has started off, the clutch is preferably engaged, causing torque no longer to be transmitted by the impeller and turbine but directly via the clutch. This advantageously reduces the power loss of the start-off element and increases its efficiency rating.

BRIEF DESCRIPTION OF THE SEVERAL VIEW OF THE DRAWINGS

The following figures depict various embodiments of the invention in which.

DETAILED DESCRIPTION OF THE INVENTION

Figure 1:
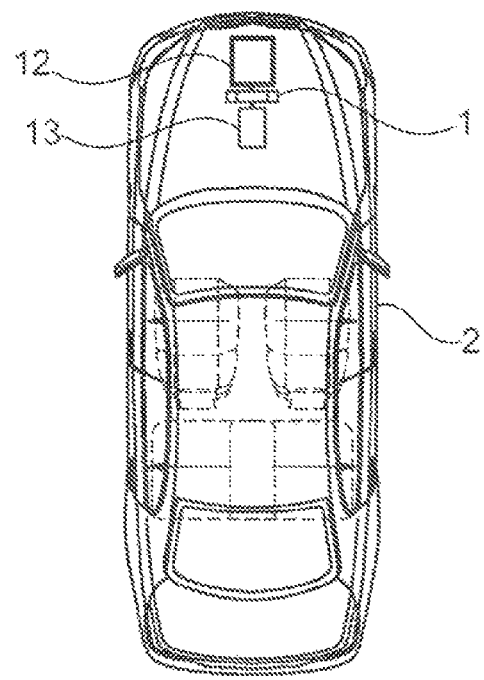
FIG. 1 is a diagrammatic representation of a motor vehicle with a hydrodynamic start-off element.
Figure 2:
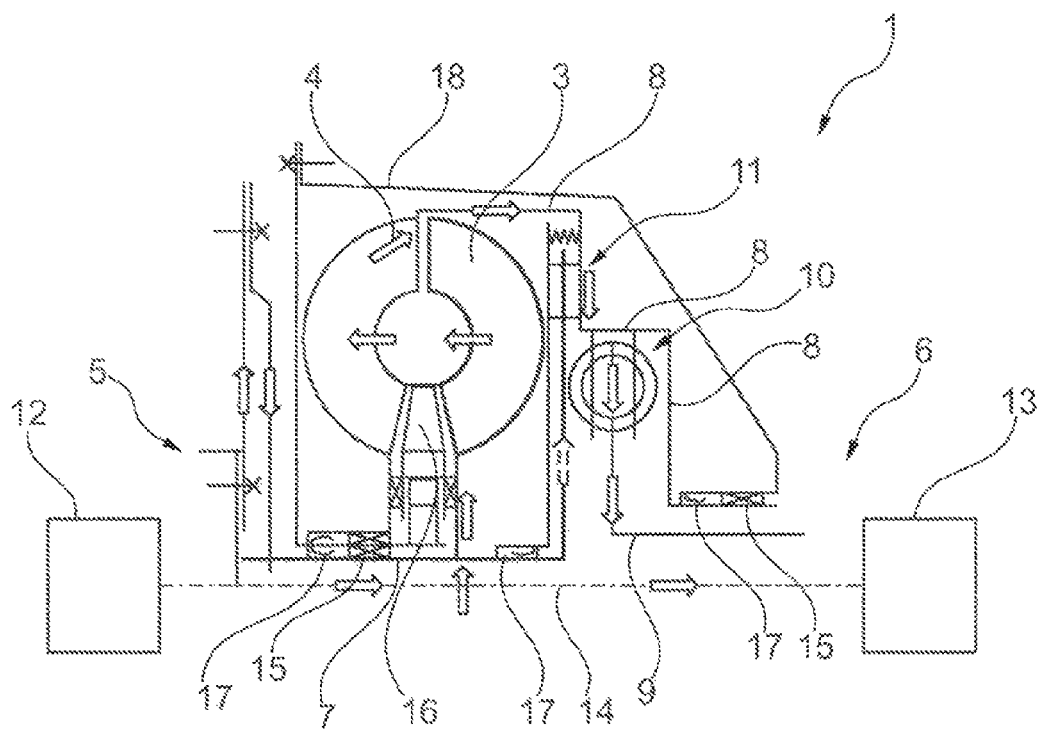
FIG. 2 is a longitudinal sectional view of a first example of a hydrodynamic start-off element; and, FIG. 3 is a longitudinal sectional view of a second example of a hydrodynamic start-off element.

FIG. 1 illustrates motor vehicle 2 including drive motor 12, hydrodynamic start-off element 1, and transmission 13. Hydrodynamic start-off element 1 is shown in a detailed view in FIG. 2. In the illustrated example, start-off element 1 is a hydrodynamic torque converter. Impeller 3 is supported for co-rotation on drive shaft 7 on drive side 5, and turbine 4 is supported for relative rotation on drive shaft 7 on power take-off side 6. Bearing 15 is provided to support turbine 4 on drive shaft 7. In addition, stator 16 is disposed between impeller 3 and turbine 4. Turbine 4 is connected to housing 8. In the illustrated example, housing 8 is a housing of the hydrodynamic torque converter. Housing 8 is capable of co-rotating with turbine 4. In addition, housing 8 is connected to transmission power take-off shaft 9 so as to be essentially fixed against relative rotation via damper 10, in the illustrated example a torsional damper. Drive shaft 7, impeller 3, stator 16, turbine 4, housing 8, damper 10, and power take-off shaft 9 are rotatable about (common) axis of rotation 14. Housing 8 is additionally fixed to drive shaft 7 and to power take-off shaft 9 in a liquid-tight manner. For this purpose, seals 17 are provided on relevant bearings 15. Drive shaft 7 is drivable by drive motor 12, which causes axis of rotation 14 to rotate. Rotating drive shaft 7 causes impeller 3 to rotate, which in turn drives turbine 4. Turbine 4 drives housing 8, which in turn drives power take-off shaft 9. Power take-off shaft 9 transmits the torque from drive motor 12 to transmission 13. The arrows in FIG. 2 indicate the flow of force of hydraulic start-off element 1. In addition, hydraulic start-off element 1 includes clutch 11 for directly transmitting torque from drive shaft 7 to housing 8 and to power take-off shaft 9, passing by impeller 3 and turbine 4. This aspect is indicated by the dashed lines in FIG. 2. All components of hydrodynamic start-off element 1 are additionally surrounded by transmission housing 18, which is fixed to drive shaft 7 in a liquid-tight manner by bearings 15 and seals 17 and which is connected for rotation to power take-off shaft 9.

Figure 3:
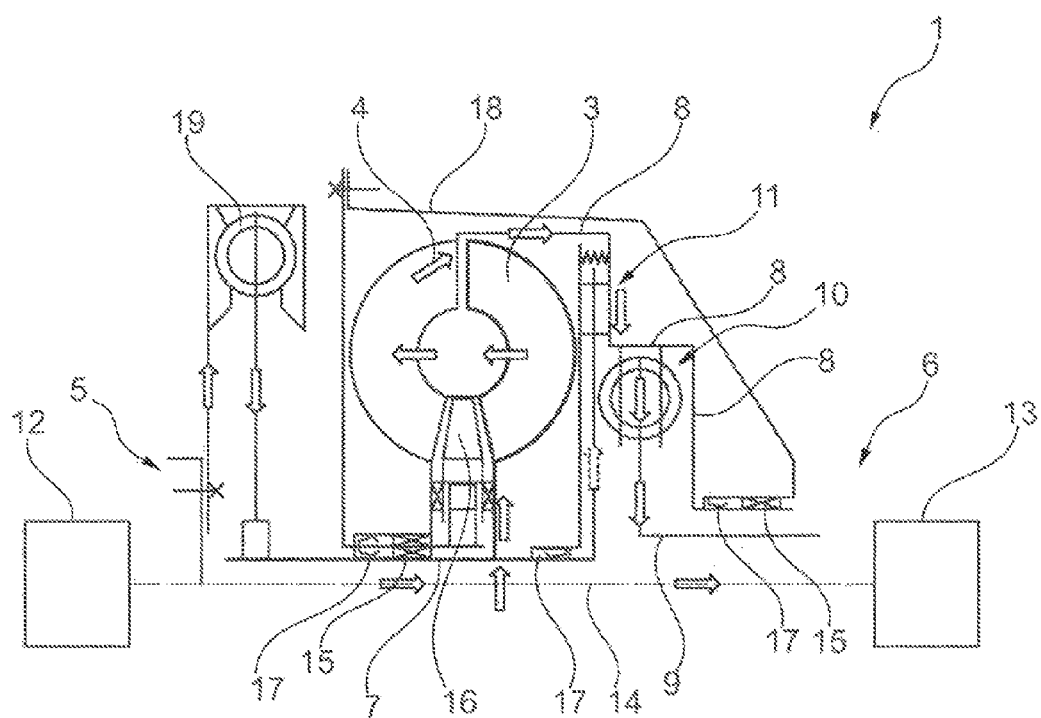

FIG. 3 illustrates a second example of hydrodynamic start-off element 1 in a longitudinal sectional view. This example differs from the one shown in FIG. 1 only in that additional damper 19 is disposed on drive side 5. For all other aspects please refer to the description of FIG. 2.

The present invention is characterized by improved driving dynamics and provides a more favorable characteristic mode of its natural frequency.

LIST OF REFERENCE SYMBOLS

1 Hydrodynamic start-off element
2 Motor vehicle
3 Impeller
4 Turbine
5 Drive side
6 Power take-off side
7 Drive shaft
8 Housing
9 Power take-off shaft
10 Damper
11 Clutch
12 Drive motor
13 Transmission
14 Axis of rotation
15 Bearing
16 Stator
17 Seals
18 Transmission housing
19 Additional damper

What is claimed is:

1. A hydrodynamic start-off element for a drive train of a motor vehicle, comprising:
   a housing in which an impeller and a turbine are disposed, the turbine connected to a power take-off side of the hydrodynamic start-off element and the impeller connected to a drive side of the hydrodynamic start-off element;
   wherein the housing is connected to a transmission power take-off shaft via a damper and the impeller is rotatable relative to the housing;
   wherein the impeller is disposed for co-rotation on a drive shaft and the turbine is supported for relative rotation on the drive shaft.

2. The hydrodynamic start-off element recited in claim 1, wherein the impeller is rotatable through at least 360° relative to the housing.

3. The hydrodynamic start-off element recited in claim 1, wherein:
   the housing extends from the turbine in a first direction toward the power take-off side; and,
   the housing at least partially encloses the impeller in the first direction.

4. The hydrodynamic start-off element recited in claim 1, wherein the housing is fixed on a first axial side of the impeller and directed in a first direction, toward the power take-off side.

5. The hydrodynamic start-off element recited in claim 1, wherein the turbine is part of the housing.

6. The hydrodynamic start-off element recited in claim 1, wherein a clutch for connecting a drive shaft for co-rotation with the housing is disposed in the housing.

7. A motor vehicle comprising a drive motor and the hydrodynamic start-off element recited in claim 1.

8. A motor vehicle comprising a drive motor and the hydrodynamic start-off element recited in claim 1.

9. A hydrodynamic start-off element for a drive train of a motor vehicle, comprising:
   a housing in which an impeller and a turbine are disposed, the turbine connected to a power take-off side of the hydrodynamic start-off element and the impeller connected to a drive side of the hydrodynamic start-off element; and,
   a clutch arranged between a drive shaft and the housing, the clutch being disposed within the housing for directly connecting the drive shaft for co-rotation with the housing;
   wherein the impeller is rotatable relative to the housing.

10. The hydrodynamic start-off element recited in claim 9, wherein the impeller is rotatable through at least 360° relative to the housing.

11. The hydrodynamic start-off element recited in claim 9, wherein:
    the housing extends from the turbine in a first direction, toward the power take-off side; and,
    the housing at least partially encloses the impeller in the first direction.

12. The hydrodynamic start-off element recited in claim 9, wherein the impeller is disposed for co-rotation on the drive shaft and the turbine is supported for relative rotation on the drive shaft.

13. The hydrodynamic start-off element recited in claim 9, wherein the housing is fixed on a first axial side of the impeller and directed in a first direction, toward the power take-off side.

14. The hydrodynamic start-off element recited in claim 9, wherein the turbine is part of the housing.

15. The hydrodynamic start-off element recited in claim 9, wherein the housing is connected to a transmission power take-off shaft.

16. The hydrodynamic start-off element recited in claim 15, wherein the housing is connected to the power take-off shaft via a damper.

17. A hydrodynamic start-off element for a drive train of a motor vehicle, comprising:
    a turbine rotatably connected to a drive shaft;
    an impeller non-rotatably connected to the drive shaft;
    a housing non-rotatably connected to the turbine, the turbine and the impeller disposed within the housing;
    a damper non-rotatably connected to the housing; and,
    a power take-off shaft non-rotatably connected to the damper;
    wherein:
      in a first torque flow path, torque is transmitted from the drive shaft, to the impeller, to the turbine, to the housing, and through the damper to the power take-off shaft; and,
      in a second torque flow path, torque is transmitted from the drive shaft, to the housing, and through the damper to the power take-off shaft.

18. The hydrodynamic start-off element recited in claim 17, wherein in the second torque flow path, torque is transmitted from the drive shaft to the housing via a clutch.

19. The hydrodynamic start-off element recited in claim 18, wherein the clutch and the damper are arranged on a first axial side of the impeller.

\* \* \* \* \*